United States Patent

[11] 3,533,431

[72] Inventors Rainer Kuenzel
Houston, Texas;
Samuel E. Gilmore, 4711 Holly, Bellaire, Texas 77401
[22] Filed April 5, 1968
[45] Patented Oct. 13, 1970
[73] Assignee said Kuenzel association to said Gilmore

[54] SNAP ACTING VALVE MECHANISM
3 Claims, 4 Drawing Figs.
[52] U.S. Cl. .................................................. 137/113; 267/181
[51] Int. Cl. .................................................. G05d 11/03
[50] Field of Search .......................................... 137/113, 112, 101; 251/75, 297; 267/181(X), 161

[56] References Cited
UNITED STATES PATENTS
2,651,491 9/1953 Ashton .......................... 137/113X
3,008,482 11/1961 Hunter .......................... 137/113

Primary Examiner—William F. O'Dea
Assistant Examiner—Howard M. Cohn
Attorney—Charles E. Lightfoot ABSTRACT: A snap acting valve for controlling the flow of pressure fluid from two separate sources of such fluid and constructed to be operated by the pressure of fluid from either of said sources upon a reduction of the pressure from one of the sources to close the valve against the flow of fluid from the one source and open the valve to the flow therethrough of fluid from the other source. The valve is constructed to open and close with a snapping action and is so designed that the valve is closed during a portion of its movement from closed to open position in either direction so that the opening and closing time of the valve may be reduced to a minimum. Valve holding and releasing means is incorporated in the structure for coaction with the valve to hold the valve against movement away from either of its extreme positions and to release the valve for movement with a snapping action from one such position to the other upon the occurrence of a predetermined reduction in the pressure of fluid from one of the sources of such pressure.

Patented Oct. 13, 1970

3,533,431

SAMUEL E. GILMORE &
RAINER KUENZEL
INVENTORS

BY
Charles E. Lightfoot
ATTORNEY

SNAP ACTING VALVE MECHANISM

BACKGROUND OF THE INVENTION

In the operation of pressure fluid actuated equipment use is often made of snap acting valve for controlling the application of such fluids. Valves of this type are frequently of the spring pressed type including some means for allowing the valve to open or close with a snapping action in response to variation in the pressure of the fluid. Such valves are usually constructed so that the valve begins to open immediately upon movement of the valve from the extreme position of its closing movement and the valve is not fully closed until it reaches the extreme position of its closing movement. In snap acting valves used for this purpose as heretofore commonly constructed, the valve often starts to open before the snapping action begins, thus substantially delaying the movement of the valve to its fully opened position. Moreover, the initial crack opening of the valve before its snapping movement to a fully open position sometimes results in cutting of the valve seat or an increase in pressure differential which may be required to operate the valve.

The present invention has for an important object the provision of a snap acting, pressure fluid actuated, valve, wherein the opening and closing of the valve takes place after the commencement of and before the completion of the snap acting movement of the valve.

Another object of the invention is to provide pressure fluid actuated, snap acting valve mechanism embodying valve holding and releasing means which is expansible in response to a variation in the pressure of such fluid to release the valve to permit the movement of the valve with a snapping action from one position to another and which is contractable upon movement of the valve to such other position to hold the valve therein.

A further object of the invention is the provision of snap acting, pressure fluid actuated valve mechanism having improved sensitivity and wear resisting characteristics, which is of simple design and rugged construction and which the parts are easily replaceable for purposes of maintenance and repair.

SUMMARY OF THE INVENTION

The valve mechanism of the invention comprises a tubular housing having an inlet at each end and an outlet mediate the ends of the housing, longitudinally spaced valve guiding and seat forming members in the housing through which fluid may flow from the inlets to the outlet, a valve movably disposed in the housing for longitudinal movement therein to one position to close one inlet against the flow of fluid therethrough while opening the other inlet and to another position to close said other inlet and open said outlet, an expansible and contractable valve holding and releasing member positioned in the housing between the valve seat forming members and shaped for coaction with the valve to releasably hold the valve in either of said positions and to be expanded in response to a variation in the pressure of fluid in the inlets to release the valve to allow the valve to move with a snapping action under the influence of the difference in pressure in said inlets from one of said positions to the other. The valve is constructed to move away from one of the extreme positions of its movement toward its other extreme position of movement before the opening of one of the valve seats and the closing of the other of the valve seats, so that the movement of the valve in either direction to open one slot and close the other is completed before the valve completes its snap acting movement.

BRIEF DESCRIPTION OF THE VIEWS OF THE DRAWINGS

The objects and advantages of the invention may best be understood from the following detailed description of a preferred embodiment of the same, when considered with the annexed drawings, wherein.

DETAILED DESCRIPTION OF A SPECIFIC EMBODIMENT OF THE INVENTION

Figure 1:
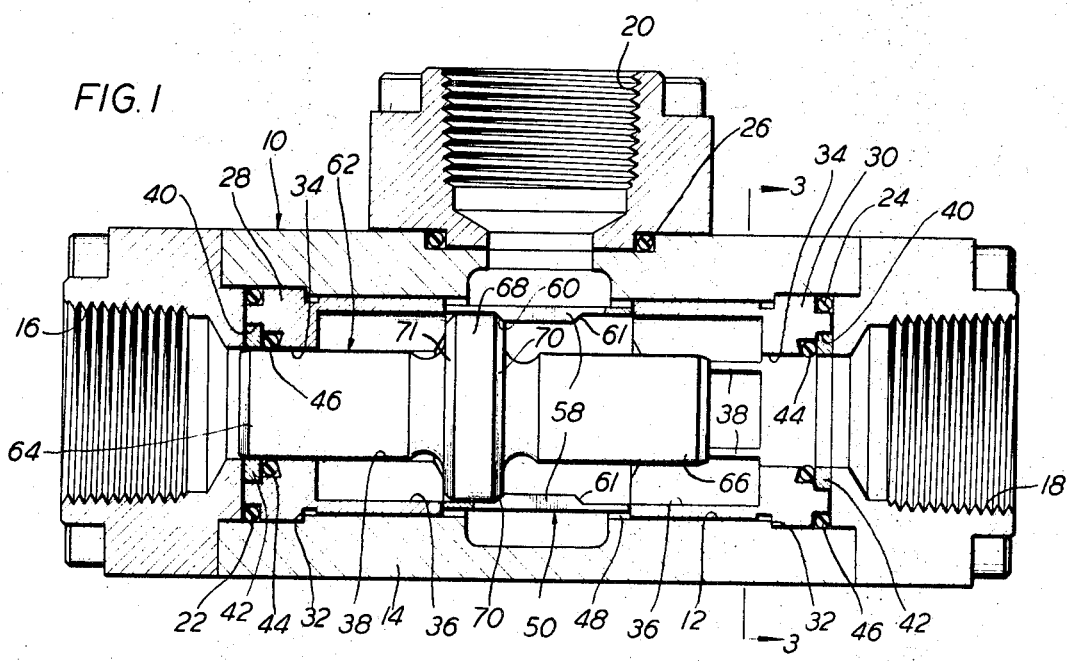
FIG. 1 is a longitudinal, central, cross-sectional view of the valve mechanism of the invention, showing the valve in one of its extreme positions of movement.

The snap acting valve mechanism of the invention comprises a housing, generally designated 10, which may conveniently be constructed in several parts, including a main body portion 14, formed with a central bore 12 and having at its ends inlet fittings or connections 16 and 18 for connection to any desired sources of pressure fluid. Mediate the ends of the housing, the same is provided with an outlet fitting or connection 20, for connection to any desired equipment to which fluid under pressure is to be delivered. Each of the fittings or connections 16, 18 and 20 may take the form of a separate part suitably fitted onto the main body portion, and releasably secured thereto, as by means of bolts, or otherwise, sealing means, such as the O-rings 22, 24 and 26, respectively, being provided, located to prevent leakage between the parts.

Within the opposite ends of the main body portion 14, valve seat forming members 28 and 30 are disposed, each of which is seated against an internal shoulder 32 in the bore 12, retained therein by the respective fitting 16 or 18, the members being formed with reduced outer end portions which together with the fittings form grooves in which the O-rings 22 and 24 are positioned.

Each of the seat forming members is of cylindrical shape to fit the bore 12 and is formed with a central bore 34 which is intersected throughout a portion of its length by a plurality of peripherally spaced bores 36 forming lands or elongated guide faces 38. Each seat forming member also has an end counterbore 40 within which a ring 42 is disposed to form an internal annular groove 44 in which an O-ring 46 is positioned to act as a valve seat.

The seat forming members 28 and 30 terminate inwardly of the bore 12 in longitudinally spaced apart relation to form between their inner ends an annular bore portion 48 in which a generally cylindrical valve holding and releasing member generally designated 50 is disposed.

Figure 2:
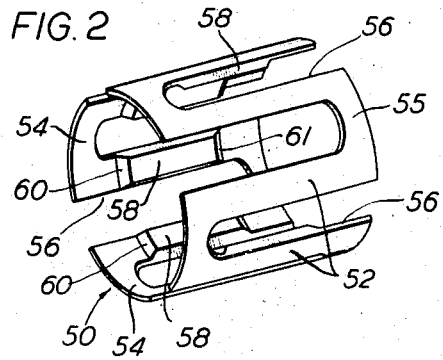
FIG. 2 is a perspective view of the valve holding and releasing member of the invention removed from the surrounding structure of the mechanism.
Figure 3:
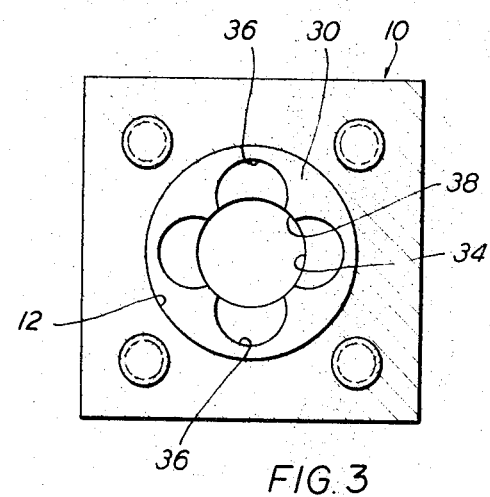
FIG. 3 is a cross-sectional view, taken along the line 3-3 of FIG. 1, looking in the direction indicated by the arrows.

The valve holding and releasing member has the configuration best shown in FIG. 2, having elongated, peripherally spaced, parallel, arms 52, each of which is connected at its opposite ends to adjacent ones of the arms by peripherally extending, connecting portions 54 and 55, to form slots 56 between the arms each of which is open at one end and closed at the other by one of the portions 54 or 55. Each of the arms 52 has an internally thickened wedging or cam portion 58 mediate its ends which is formed with tapered end faces 60 and 61. The valve holding and releasing member thus takes the form of a resilient, spring-like device in which the arms 52 are relatively flexible and are connected by the flexible peripherally extending portions 54 so that the member is expansible and contractable.

The member 50 is loosely held between the ends of the seat forming members 28 and 30, so that it may freely expand and contract in the bore portion 48, but is held against longitudinal movement therein.

A valve, generally designated 62, is movably disposed in the housing for longitudinal movement therein between the fittings 16 and 18, the valve having opposite end portions 64 and 66 which are slidably fitted into the bores 34 of the seat forming members 28 and 30 for movement into and out of the O-rings 46 to open and close the valve, and a central external enlargement or wedge portion 68 positioned for longitudinal movement in the valve holding and releasing member 50 and formed with bevelled end faces 70 and 71 disposed for engagement with the respective bevelled faces 60 and 61 of the cam portions 58 to expand the member 50 upon such movement of the valve in either direction.

The end portions 64 and 66 of the valve are each of a length to extend through and beyond the respective O-rings 64 when the valve is in either of its extreme positions and the over all length of the valve is such that the valve will be in closing relation to one of the valve seat forming members until the snapping action of the valve in one direction has been initiated, whereupon the valve moves suddenly to the limit of its movement in the one direction thus opening one valve seat after the snapping movement has started and closing the other valve seat before the completion of the snapping movement. It will also be seen that the valve will be in substantially closing engagement with one seat forming member after the valve has moved out of the O-ring thereof, and will be in substantially closing engagement with the other seat forming member before the valve reaches the O-ring of the other seat forming member.

In making use of the invention the valve may be connected into a pressure fluid system in which the inlets 16 and 18 are connected in communication with separate sources of fluid under pressure, while the outlet 20 is connected in communication with some equipment to which pressure fluid is to be supplied. With the valve thus installed, and the valve in the position shown in FIG. 1, fluid under pressure may flow through inlet 18 and outlet 20 to the equipment to be supplied.

In the event that the supply of pressure fluid to inlet 18 should fail or fall below a predetermined pressure, the pressure of the fluid in the inlet 16 will move the valve to the right as viewed in FIG. 1 to cause the tapered face 70 of the valve in engagement with the tapered faces 60 of the cam portions 58 to expand the valve holding and releasing member 50 to release the valve, which is thereupon moved with a snapping action to a position to close the inlet 18 and open the inlet 16 to supply pressure fluid therethrough to the outlet 20.

Figure 4:
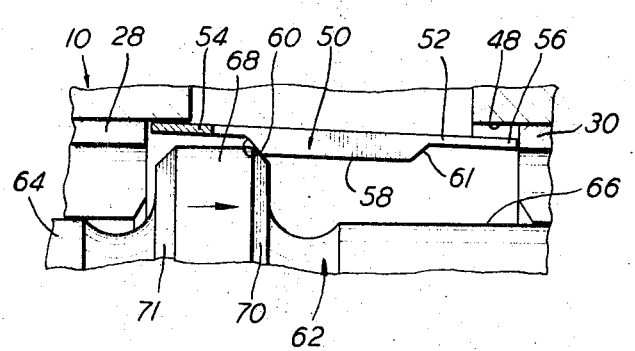
FIG. 4 is a fragmentary view similar to that of FIG. 1 showing the valve in another position of its movement.

Upon expansion of the member 50 as described above the peripherally extending, curved portions 54 at the end of the member which is in abutment with the seat forming member 28 will be expanded into engagement with the surrounding internal surface of the housing, as seen in FIG. 4, before the bevelled face 70 of the valve passes beyond the bevelled faces 60 of the holding member 50, whereupon the portions 54 are held against further expansion, and further movement of the valve then causes expansion of the other end of the holding member until the face 70 passes the faces 60 to release the valve.

When the valve has moved to the position to close the inlet 18 and open inlet 16, the face 71 will have moved past the faces 61 of the member 50 and the member will again contract to the position of FIG. 1 with the face 71 positioned in engagement with the faces 61 to hold the valve stationary.

The slope of the faces 70 and 71 or of the faces 60 and 61 may be suitably adjusted to control, within wide limits, the pressure differential which is required to actuate the valve. By suitably varying the thickness of the portions 54, 55 and 56 of the member 50 and the slope of the camming or wedging faces 70 and 71 or the camming or wedging faces 60 and 61, it will be apparent that valve mechanism may be provided for actuation at widely varying pressures upon the occurrence of any desired pressure differential.

It will thus be seen that the invention provides snap acting valve mechanism of improved sensitivity and which is capable of being constructed for operation under any desired differential pressure conditions.

The invention is disclosed herein in connection with a particular embodiment of the same, which is intended by way of illustration only, it being apparent that various changes can be made in the construction and arrangement of the parts within the spirit of the invention and the scope of the appended claims.

We claim:
1. In a snap acting valve mechanism:
 a. a hollow housing having longitudinally spaced apart inlets and an outlet located between the inlets;
 b. means forming valve seats in the housing through which fluid may flow through said outlet through each inlet;
 c. a valve movably disposed in the housing for longitudinal movement therein under the influence of a difference in the pressure of fluid in the inlets to one position to close one of said seats and open the other seat and to another position to close said other inlet and open said one inlet; and
 d. a generally cylindrically shaped valve holding and releasing member in the housing formed with elongated, longitudinally extending, peripherally spaced, flexible positions arranged about the exterior of the valve each of which is provided with a radially inwardly thickened portion mediate its ends formed with oppositely facing bevelled faces positioned for engagement with said surfaces to yieldingly resist movement of the valve away from either of said positions where said difference in pressure falls below a predetermined value and to allow the valve to move from one to the other of said positions with a snapping action when said difference in pressure exceeds said predetermined value.

2. The snap acting valve mechanism as claimed in claim 1, wherein said flexible portions are shaped to be expanded at one end into engagement with the internal surface of the housing upon movement of the valve in either direction with one of said faces in engagement with one of said surfaces, and to be expanded at the other end into engagement with the internal surface of the housing when said valve moves to a position to move said one face past said one surface.

3. The snap acting valve mechanism as claimed in claim 1, wherein said holding and releasing member is formed at each end with peripherally extending flexible portions connecting the ends of adjacent ones of said peripherally spaced flexible portions.